United States Patent

[11] 3,590,426

[72] Inventor Casimir W. Nowicki
Toledo, Ohio
[21] Appl. No. 656,116
[22] Filed July 26, 1967
[45] Patented July 6, 1971
[73] Assignee Owens-Illinois, Inc.

[54] APPARATUS FOR FORMING PLASTIC ARTICLES
3 Claims, 4 Drawing Figs.

[52] U.S. Cl. ................................................ 18/5 BM
[51] Int. Cl. ................................................ B29d 23/03
[50] Field of Search ........................................ 18/5, 5 BP;
264/97

[56] References Cited
UNITED STATES PATENTS
2,864,124  12/1958  Strauss ........................ 18/5 BI
3,264,684  8/1966  Moslo ........................... 18/5 BI Primary Examiner—J. Spencer Overholser
Assistant Examiner—Michael O. Sutton
Attorneys—Philip M. Rice and W. A. Schaich ABSTRACT: Apparatus is provided for injection molding, at one station, a substantially flat, disc-shaped parison while simultaneously blow molding, at a second station, a cup-shaped container from a previously formed parison. The apparatus has common clamping means for closing the injection mold and the blow molds with the clamping means arranged to provide maximum clamping force at the injection mold and only minimal forces at the blow molds.

PATENTED JUL 6 1971 3,590,426

INVENTOR.
CASIMIR W. NOWICKI
BY Philip M. Rice
& W. A. Schaich
ATTORNEYS

APPARATUS FOR FORMING PLASTIC ARTICLES

SUMMARY OF THE DISCLOSURE

It is generally known to form a plastic container by a process wherein a substantially flat parison is injection molded in an injection mold cavity and is then carried by part of the injection mold to a blow mold where such parison is pressure formed into an article whose exterior surface conforms to the mold cavity. Such a process is disclosed in U.S. Pat. No. 3,298,893.

The present invention provides apparatus for forming cup-shaped containers from injection molded parisons and for injection molding such parisons. The apparatus is characterized by the provision of a common clamping means for closing the injection mold and the blow molds. Additionally, the apparatus is provided with a mounting means feature for the injection head and the blow molds which permits the single common clamping means to be utilized without the necessity of precisely positioning the blow molds relative to the injection head as would otherwise be required in using such common clamping means.

In view of the foregoing, it is an object of the present invention to provide apparatus for simultaneously injection molding disc-shaped parisons and blow molding previously formed parisons, It is a further object of the present invention to provide apparatus in which a single power means may be utilized for closing both the injection head and the blow molds but which is so designed that the clamping force between the injection molds and the injection heads is greater than the clamping force between the injection molds and the blow molds.

It is a further object of the present invention to provide apparatus in which the blow molds are mounted on a floating support mechanism.

An additional object of the present invention is to provide a new and novel method and apparatus for molding plastic containers.

Other objects and advantages of the present invention will become readily apparent from the following detailed description taken in conjunction with the annexed sheets of drawings on which:

Figure 2:
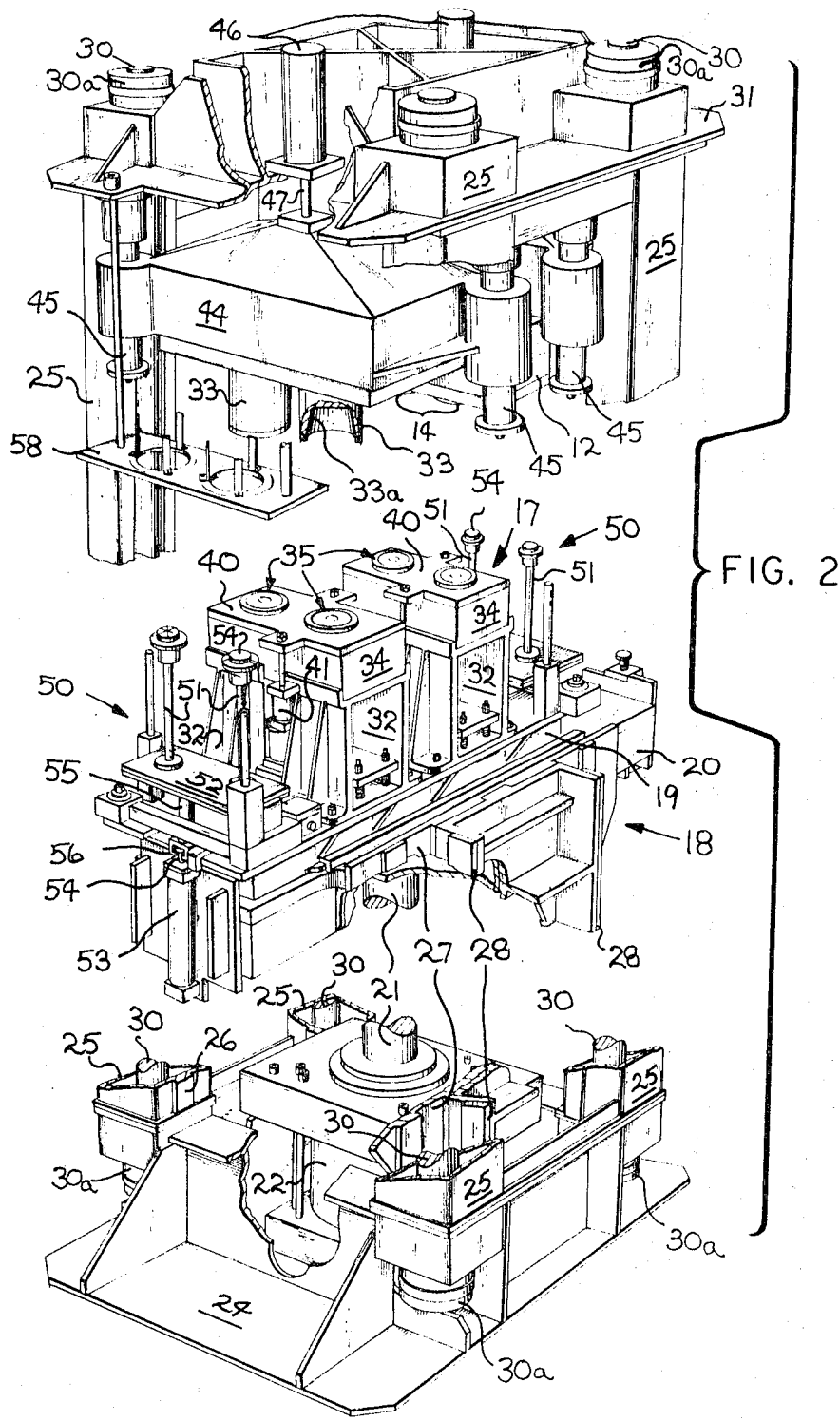
FIG. 2 is a perspective view thereof, partly in section.
Figure 3:
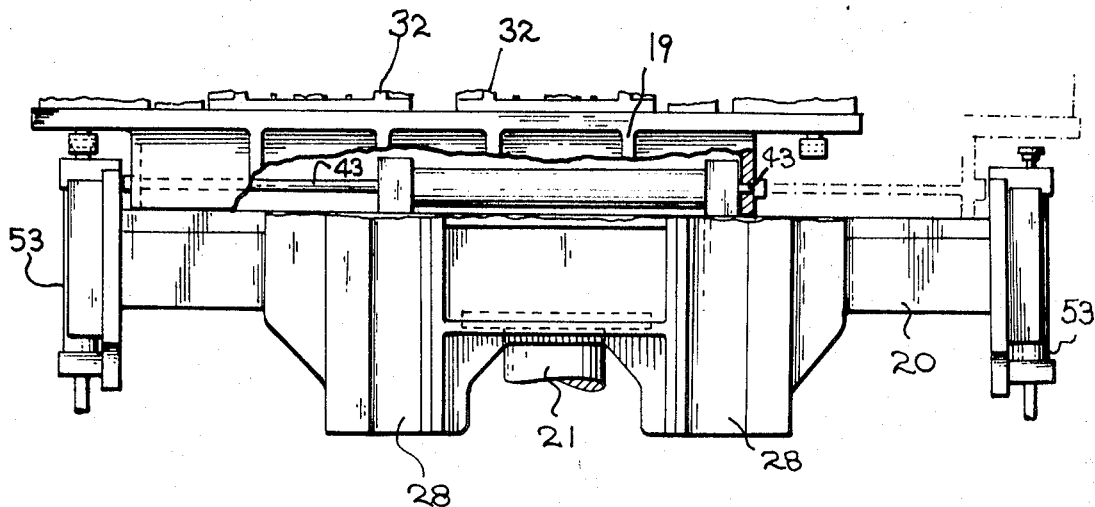
FIG. 3 is an elevational view of the table and carriage assembly thereof.

Referring now to the drawings, there is provided a machine generally designated by the numeral 10 for forming cup-shaped containers designated by the letter C. The machine includes an injection block 12 which receives heated and plasticized thermoplastic material from a conventional extruder (not shown). Connected to the injection block 12 is at least one injection head 14 having an outlet orifice 15 through which the heated thermoplastic material may pass. Depending on the size of the containers C to be formed, there may be one or a plurality of injection heads 14 secured to the injection block 12. As illustrated in FIG. 2, the present embodiment of the machine is provided with two injection heads 14.

Positioned under the injection head 14 and movable relative thereto, is a parison mold assembly generally designated by the numeral 17. The parison mold assembly 17 is mounted on a carriage and table assembly generally designated by the numeral 18. The carriage and table assembly 18 includes a carriage member 19 which is slidably mounted on a table 20 axially movably supported on the piston 21 of a hydraulic clamp cylinder 22. The table 20 thus can be moved vertically between a raised position, the position illustrated in FIG. 1, and a lowered position, such lowered position being indicated by phantom line 23 in FIG. 1.

The injection clamp cylinder 22 is mounted on a support block 24 which has four columns 25 extending upwardly therefrom. The columns 25 are positioned in the corners and each has guide keys 26 which are received in guide keyways 27 of vertical members 28 carried on the table 20. The columns 25 and vertical members 28 thus cooperate to guide the table 20 in its movement between a raised and a lowered position.

Interiorly of each of the columns 25 is positioned a tension rod 30 secured, by means of collars 30a, at the bottom to the support block 24 and at the top to an upper structural member 31. The tension rods serve to transmit the force resulting from upward urging of the parison mold assembly 17 against the injection head 14 from the upper structural member 31 to the support block 24. The forces are transmitted from the injection heads 14 to the upper structural member 31 by means of blocks 29 extending from the injection block 12 to such upper structural member.

Positioned on opposite sides of the injection head 14 and carried by the upper structural member 31, are a plurality of blow molds 33 each having a cavity 33a corresponding to the desired external configuration of the cup-shaped containers C. Although the drawing illustrates two blow molds on each side of the row of injection heads 14, it will be understood that this number will vary depending upon the number of injection heads 14 provided. Thus, the total number of blow molds 33 will be double the number of injection heads 14.

Positioned on the carriage 19 are a plurality of support members 32 carrying blocks 34 on which are carried components forming a plurality of injection molds 35, the number of injection molds 35 being equal to the number of blow molds 33. As shown on the drawings, the injection molds 35 are positioned in two rows with one row being positioned beneath the injection heads 14 and the other row being positioned beneath one set of blow molds 33.

Figure 4:
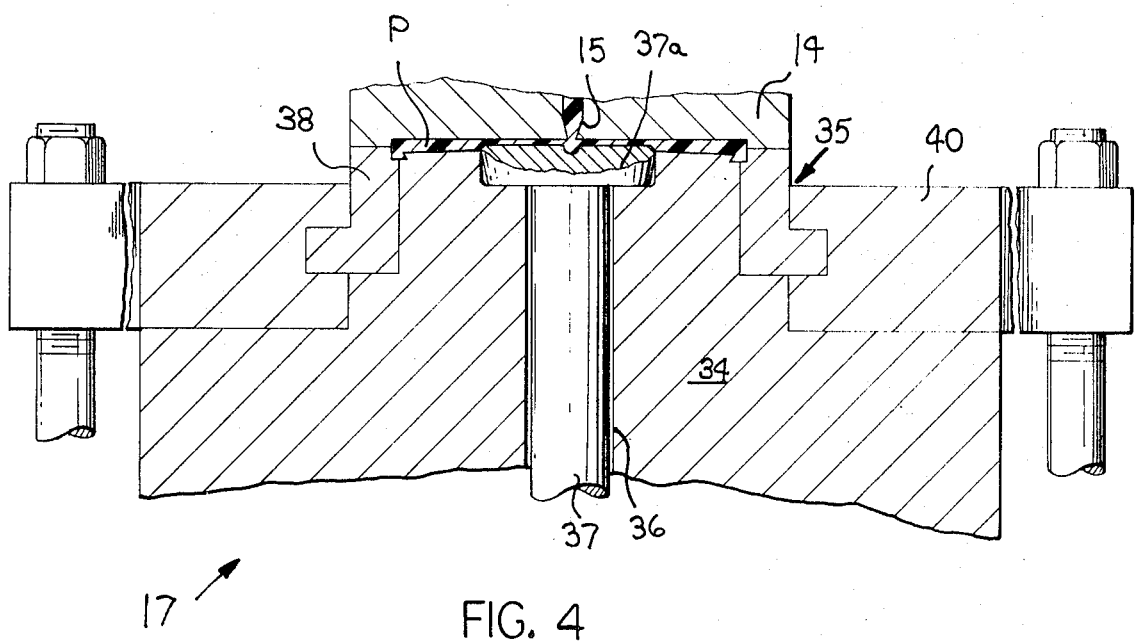
FIG. 4 is a sectional view of an injection mold clamped to an injection head with an injection molded parison confined therebetween.

The injection molds 35 cooperate with the injection heads 14 to injection mold a substantially flat disclike parison P (see FIG. 4). The components forming the injection molds 35 include a block 34 having a bore 36 formed therein, a plunger 37 positioned in said bore and a ring element 38. The plunger 37 has an enlarged head portion 37a. During the injection molding step, the injection molds 35 cooperate with the injection heads 14 to define a molding cavity in which the parison P is molded. The portion of the parison P formed between the plunger head 37a and the injection head 14 forms the bottom of the cup-shaped container C and is substantially the same thickness as that portion of the finished container C. The portion of the parison P formed between the block 34 and the injection head 14 forms the sidewall portion of the finished container C and is substantially thicker than the finished sidewall portion. The outer periphery of the parison P which is formed between the ring element 38 and the injection head 14 forms the rim portion of the cup-shaped container C and is substantially the same contour as that portion of such container.

Figure 1:
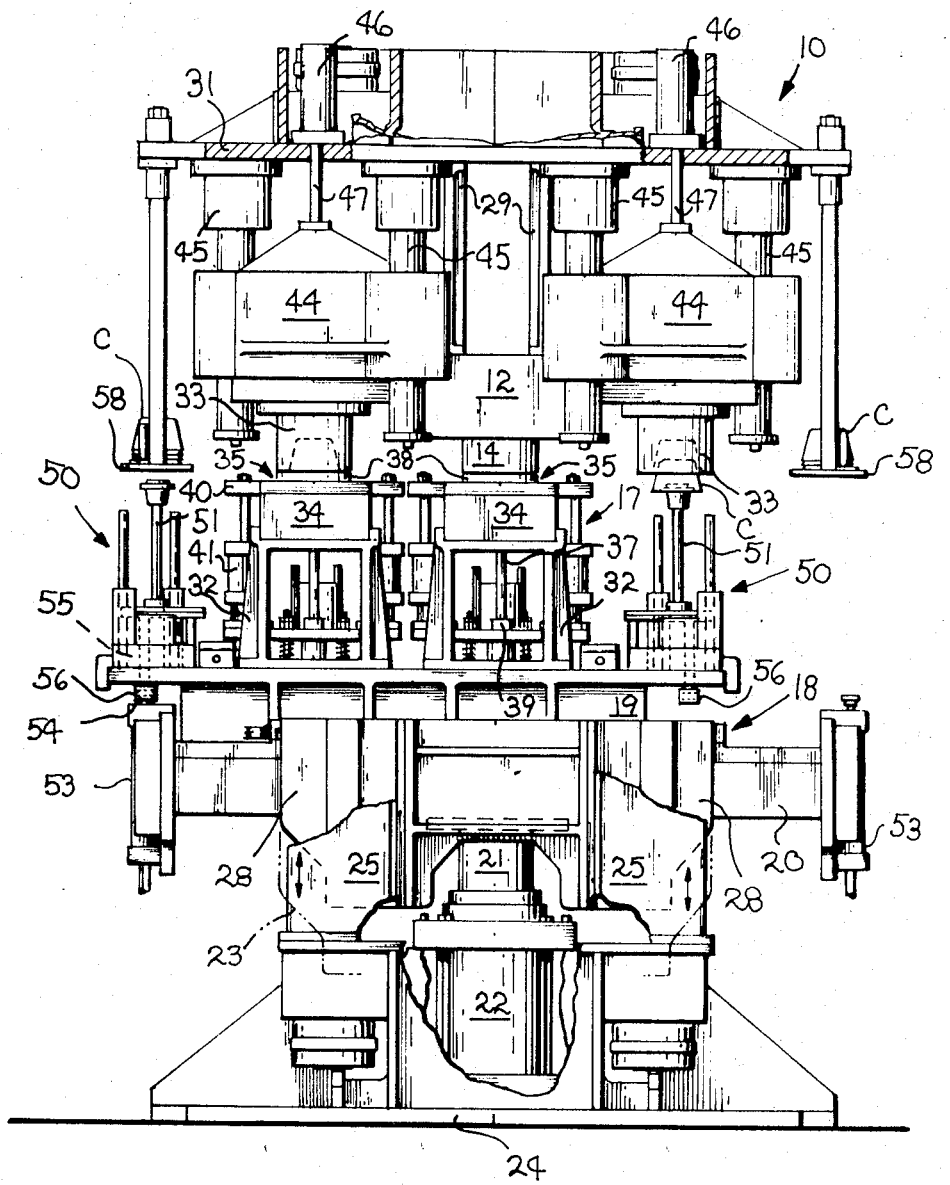
FIG. 1 is a front elevational view showing the apparatus of the present invention.

The plunger 37 is axially movable in the bore by means of a fluid pressure cylinder 39 (see FIG. 1). The ring element 38 is axially movable relative to the block 34. Such movement is effected by means of a carrying member 40 secured to the ring element 38 with the power for such movement being provided by fluid pressure cylinders 41. A detailed description of the parison P and the interaction of the various elements of the injection molds 35, injection heads 14 and blow molds 33 in forming the parison P and deforming such parison to form a container C may be had by referring to copending U.S. Pat. application Ser. No. 577,518, filed Sept. 6, 1966, which is assigned to the assignee of the present application, and which has matured into U.S. Pat. No. 3,471,896.

Mounted on the table 20 is a double acting cylinder 42 having a pair of piston rods 43, the actuation of which serves to laterally shift the carriage 19 on the table 20. Such shifting serves to transfer the injection molds 35 between positions aligned with the injection heads 14 and one or the other of the sets of blow molds 33. In other words, the injection molds 35 positioned on the left side of the machine as viewed in FIG. 1 are moved from a position of alignment with the left-hand blow molds 33 to a position of alignment with the injection heads 14 and then back to a position of alignment with the left-hand blow molds 33. The injection molds 35 positioned on the right side of the machine as viewed in FIG. 1 are shifted from a position in alignment with the injection head 14 to a position of alignment with the right-hand blow molds 33 and then back to a position of alignment with the injection heads 14.

The blow molds 33 are supported on cross members 44 which are mounted for slideable movement on vertical rods 45. Such cross members 44 are normally urged to the lowest position permitted by the rods 45 by means of fluid pressure cylinders 46 secured to the upper structural member 31 and having piston rods 47 engaged to the cross members 44. The cylinders 46 are of a very small capacity relative to the injection clamp cylinder 22 and will readily yield to forces acting thereagainst which are transmitted from the injection clamp cylinder 22. This is true even though the force to be overcome by the clamp cylinder 22 is offset a substantial distance relative to the axis of such cylinder. The cross members 44 thus support the blow molds 33 for flotation between a lower position and an upper position. In the lower position, the lower portion of the blow molds 33, which is engaged by the injection molds 35, is below the corresponding portion of the injection head 14. Thus, actuation of the injection clamp cylinder 22 to move the carriage and table assembly 18 and the parison mold assembly 17 carried thereon upwardly causes the one set of injection molds 35 to initially engage the blow molds aligned therewith and urge them upwardly against the action of the cylinder 46. Such upward movement continues until the other set of injection molds engage the rigidly mounted injection heads 14.

Positioned on opposite ends of the carriage 19 and laterally shiftable therewith are a pair of takeout assemblies generally designated by the numeral 50. Each takeout assembly includes a pair of plungers 51 positioned on a platform 52 mounted for movement between a raised and a lowered position relative to the carriage 19. Power for such movement is provided by cylinders 53 positioned on opposite ends of the table 20. Extending upwardly from the cylinders 53 are piston rods 54 having enlarged heads on the free ends thereof. Extending downwardly from the platforms 52 are shafts 55 having slotted connectors 56 at the lower ends. One of the slotted connectors 56 becomes engaged with one of the enlarged heads of the rods 54 when carriage 19 is shifted to one extreme lateral position. It becomes disengaged when the carriage 19 is shifted to the other lateral position at which position, the other of the slotted connectors 56 engages the other enlarged head.

Positioned on opposite ends of the upper structural member 31 and supported thereon are a pair of stacking frames 58. When the carriage is in one lateral position, the plungers 51 on one end of the carriage 19 are positioned under the blow molds 33 to thereby catch and retain thereon the cups C as they are ejected from such molds 33. In that position, the plungers 51 on the other end of the carriage are in alignment with the stacking frame at that end of the carriage. When the carriage 19 is shifted to the other lateral position, the one set of plungers are shifted from alignment with the blow molds 33 to alignment with the stacking frame 58 while the other set of plungers are shifted from alignment with the other stacking frame 58 to alignment with the other set of blow molds 33. The details of the stacking frame 58 are fully described in U.S. Pat. application Ser. No. 604,987, filed Dec. 27, 1966, which is assigned to the assignee of the present application. It will be recognized that other means may be provided for removing the newly formed cups C or they may be removed by hand.

Beginning with the carriage and table assembly 18 in the left lateral position, as illustrated in FIG. 1, but in a lowered position with respect to the blow molds 33 and injection head 14, a complete cycle of operation will be described. Initially, the injection clamp cylinder 22 is actuated to raise the carriage and table assembly 18 so that the left row of injection molds 35 as viewed in FIG. 1 engages the left row of blow molds 33 and the right row of injection molds 35 engages the row of injection heads 14. In this position, the plungers 51 of the right takeout assembly 50 are aligned beneath the right row of blow molds 33. During upward movement, the left row of injection molds 35 contacts the left row of blow molds 33 prior to the right row of injection molds 35 contacting the injection heads 14. Continued upward movement of the carriage and table assembly 18 after the initial contact between such injection molds 35 and blow molds 33, causes said blow molds to be urged upwardly against the pressure of the cylinder 46. The cylinder 46 readily yields to such upward movement of the carriage and table assembly 18 by virtue of the great force generated by the clamp cylinder 22 as compared with the relatively small force generated by the opposed cylinder 46. Continued upward movement causes the right row of injection molds 35 to sealingly engage the injection heads 14. It will be noted that the forces used in closing and sealing the injection molds 35 against the injection heads 14 are applied along the centerline of the machine and that such injection molds and injection heads are also located along the centerline of the machine. In contrast, the blow molds 33 are offset from such centerline and by virtue of the yielding action of the relatively small cylinder 46, the pressure used to close the injection molds 35 against the blow molds 33 is much smaller than that used to close the injection molds 35 against the injection heads 14.

Parisons P are then injection molded in the cavities defined between the injection molds 35 and the injection heads 14. Simultaneously, previously formed parisons are expanded in the cavities defined between the left row of blow molds 33 and injection molds 35. Additionally, previously blown containers C are ejected from the right row of blow molds 33 and are retained on the plungers 51 of the right takeout assembly 50. Also during this same interval, the left fluid pressure cylinder 53 is actuated to lift the containers C previously ejected from the left row of blow molds 33 into the left stacking frame 58 and to return to its lowered position as shown in FIG. 1.

Thereafter, cylinder 22 is actuated to lower the carriage and table assembly 18 after which the double acting cylinder 42 is actuated to laterally shift the carriage 19 to the right as viewed in FIG. 1 so that the right row of injection molds 35 carrying the newly formed parisons P become aligned with the right row of blow molds 33 and the left row of injection molds 35 become aligned with the injection heads 14. Additionally, the right takeout assembly 50 is positioned with its plunger 51 aligned with the right stacking frame 58 and the left takeout assembly 50 is positioned with its plunger aligned with the left row of blow molds 33. Then the injection clamp cylinder 22 is again actuated to raise the carriage and table assembly 18 to clamp the parison P between the right row of injection molds 35 and the right row of blow molds 33, and the left row of injection molds 35 against the injection heads 14. In this position, the steps previously described are repeated. Additional details of forming the parison P and blow molding the cup-shaped containers therefrom are given in U.S. Pat. application Ser. No. 577,518, filed Sept. 6, 1966, assigned to the assignee of the present application, which description is herein incorporated by reference.

Thereafter, the injection clamp cylinder is again actuated to lower the carriage and table assembly 18. The double acting cylinder 42 is then again actuated to laterally shift the carriage 19 and the parison mold assembly 17 back to the lateral position illustrated in FIG. 1.

It will be obvious to those skilled in the art that numerous modifications can be made in the present invention without changing the intent or the scope thereof. For example, a plurality of compression springs could be provided in place of the fluid pressure cylinders 46 to maintain the blow molds 33 in a floating position with respect to the injection head 14.

It can be readily seen that the foregoing invention provides method and apparatus for efficiently forming plastic containers with great efficiency and from the initial melting and plasticizing of the material to the collecting and stacking of the finished cups. The mechanism for closing the injection molds and the blow molds permit the machine to be formed with very liberal tolerances and eliminates the necessity of attempting to precisely match the position of parts located in remote parts of the machine.

Several modifications will become readily apparent to those skilled in the art. Accordingly, the true scope of the invention is defined by the scope of the following claims.

I claim:

1. Apparatus for molding plastic articles comprising
a centrally positioned injection head,
blow molds positioned on opposite sides of said injection head,
two sets of injection molds, each of which is cooperable with the injection head to form injection molded parisons and cooperable with one of the blow molds to deform the parisons therein to form the desired articles,
said injection molds positioned to have one set aligned with the blow molds on one side of the injection head when the other set is aligned with the injection head and to have said other set aligned with the blow molds on the other side of said injection head when said one set is aligned with the injection head,
power means for moving the injection molds axially into and out of engagement with the injection head and the blow molds,
said power means being positioned centrally in alignment with said injection head to provide a greater clamping force between the injection molds and the injection head than between the injection molds and the blow molds when said injection molds are engaged therewith,
and means for shifting said injection molds between positions of alignment with said injection mold and the respective blow mold when said injection molds are out of engagement therewith, said blow molds being mounted in a position to be engaged by the aligned injection molds before the injection head is engaged by the injection molds aligned therewith upon axial movement of the carriage means theretowards, and being mounted to be yieldingly urged by the movement of such injection molds thereagainst.

2. In an apparatus for molding hollow plastic articles by first producing a parison by injection molding and then expanding the parison by blow molding to produce the desired article, the improvement comprising,
   a. An injection head having an orifice adapted to supply molten thermoplastic material under pressure,
   b. A pair of blow molds respectively laterally positioned on opposite sides of said injection head,
   c. A pair of identical mold parts, each of which is alternatively cooperable with said injection head to define an injection molded parison cavity and with one of the blow molds to define a blow mold cavity conforming to the desired article,
   d. A frame carrying said mold parts, said parts being positioned on said frame to permit one said mold part to be aligned with the blow mold on one side of the injection head when the other mold part is aligned with the injection head and alternatively to permit said other mold part to be aligned with the blow mold on the other side of said injection head when said one mold part is aligned with the injection head,
   e. Means for laterally reciprocating said frame between a position where one of said mold parts is aligned with said injection head and a position where said one mold part is aligned with one of said blow molds,
   f. Power means for reciprocating said frame in an axial direction relative to said orifice to position said mold parts concurrently into and out of engagement respectively with the injection head and a blow mold, and
   g. Means yieldingly permitting limited axial movement of said blow molds relative to said injection head, whereby a greater clamping force is provided between the one said mold part and said injection head than between said other mold part and one said blow molds.

3. The apparatus defined in claim 2 wherein said last-mentioned means comprises a hydraulic cylinder supporting each blow mold for movement in an axial direction and exerting a force on said blow mold in the mold clamping direction which is substantially less than the force exerted by said power means.